United States Patent [19]

Bauman

[11] Patent Number: 5,512,923

[45] Date of Patent: Apr. 30, 1996

[54] COLOR VARIATION CONTROL METHOD FOR INK-JET PRINTERS

[75] Inventor: Joseph H. Bauman, Vancouver, Wash.

[73] Assignee: Hewlett-Packard Company, Palo Alto, Calif.

[21] Appl. No.: 955,541

[22] Filed: Sep. 30, 1992

[51] Int. Cl.$^6$ .................................................... B41J 2/205
[52] U.S. Cl. ................................ 347/15; 347/43; 358/298
[58] Field of Search ......................... 346/75, 157, 140 R, 346/1.1; 358/296, 80, 502, 298, 518, 519, 520, 534; 347/15, 43, 41, 9

[56] References Cited

U.S. PATENT DOCUMENTS

| | | | |
|---|---|---|---|
| 4,748,453 | 5/1988 | Lin et al. | 347/41 |
| 4,750,009 | 6/1988 | Yoshimura | 347/43 |
| 4,855,752 | 8/1989 | Bergstedt | 347/41 |
| 4,967,203 | 10/1990 | Doan et al. | 347/41 |
| 5,075,689 | 12/1991 | Hoisington et al. | 347/41 |
| 5,255,009 | 10/1993 | Bauer et al. | 347/19 |

FOREIGN PATENT DOCUMENTS

| | | |
|---|---|---|
| 0390473 | 10/1990 | European Pat. Off. . |
| 3412531 | 10/1985 | Germany . |

Primary Examiner—John E. Barlow, Jr.

[57] ABSTRACT

A method for eliminating visible color variation, or color banding, in areas of the printout that color and black inks are capable of touching, without significant reduction in color-tint printout throughput, are described. The invented method includes detecting or analyzing areas in a print swath defined by a single horizontal pass of the printhead that contain superposed color and black dots. Upon detection of such a condition, the method further includes subdividing the typically broader black swath, e.g. forty-eight orifices, into a number of narrower swaths, e.g. by selecting only certain closely vertically adjacent ones of the orifices and their corresponding ink jets, that preferably are of equal vertical height to the height of the corresponding color swath, e.g. sixteen orifices. Printing is performed then-black ink during a first carriage pass followed by color ink during a subsequent carriage pass-by time interleaving one or more of the preferably equal height black and color swaths in such manner that the time between horizontally adjacent black and color ink-jet firing, or dot printing, is substantially constant. Preferably, the method avoids black swath down-sizing or other spatial or temporal accommodations when there is no likelihood of visible color-banding, i.e. when it is determined that there is in the present swath no color and black liquid ink interposition that could result in bleeding.

4 Claims, 2 Drawing Sheets

COLOR VARIATION CONTROL METHOD FOR INK-JET PRINTERS

TECHNICAL FIELD

The present invention relates generally to improved control of color variations in ink-jet printers having black and color pens. More particularly, the invention concerns a method that detects when black and color inks will be printed horizontally adjacent one another and to order and time black and color printing to produce high-quality color printing that exhibits no visible banded, or variegated, color artifacts.

BACKGROUND ART

Most black and tri-color ink-jet printers have two pens on the printhead carriage, one black with a given number of vertically arranged orifices and one tri-color with the same number of vertically arranged orifices evenly distributed among the three primitive colors, i.e. cyan, magenta and yellow. Because of the disparate numbers of orifices between a given color and black, and because in order to maximize throughput substantially all of the orifices of both typically are used to deposit ink during each pass of the printhead carriage, color (tint) variations appear as regular-periodic, horizontal bands in areas where color and black ink are adjacent and/or touching, e.g. when printing a dark cyan tint by interposing black dots within an otherwise cyan field. This visible "color-banding" phenomenon—which is caused by varying time delays between interposed, color and black liquid ink dot deposition—previously has been addressed at significant throughput cost, and with only limited success.

One such conventional solution will be referred to herein as "shingling." Shingling is a method of printing whereby a first checkerboard print pattern of dot groups resembling shingles on the roof of a house first are printed during a first pass of the printhead and subsequently interstitial dot groups within one or more complementary checkerboard print patterns are printed during one or more further passes over the same print area. The overhead cost of shingling in the best case wherein two interposed checkerboard patterns are used approaches 100%, thus typically reducing high-quality color printing throughput by almost 50%.

DISCLOSURE OF THE INVENTION

The invented method of the invention effectively eliminates visible color variation, or color banding, in areas of the printout that color and black inks are capable of touching and where they heretofore would have bled unevenly with one another, without the significant reduction in color-tint printout throughput that attends prior art solutions such as shingling. The invented method includes detecting areas in a print swath, defined by corresponding horizontal passes of the printhead, that contain interposed, or more specifically juxtaposed, color and black dots. Upon detection of such a condition, the method further includes subdividing the typically taller black swath, e.g. of 48 orifice height, into a number of shorter swaths that preferably are of equal vertical height to the height or the corresponding color swath, e.g. of 16 orifice height. Printing is performed then by time interleaving one or more of the preferably equal height black and color swaths in such manner that the time between horizontally adjacent black and color dot printing is consistent, preferably approximately constant and most preferably substantially constant.

Visible, cyclic color banding or variegated color is eliminated, while overhead is increased by only approximately 5–25%, with such overhead being attributable to the less efficient black-printing passes of the printhead wherein fewer than all of the black pen's ink jets are utilized. Preferably, the method avoids black swath down-sizing when there is no likelihood of visible color-banding, i.e. when it is determined that there is in the present swath no color and black ink drop placement, i.e. interposition or juxtaposition, that could result in bleeding. Thus, the extremely modest overhead that is occasioned by the invented color band-guarding solution is avoided entirely in cases that are determined by the intelligent printer controller to pose no color-banding problem.

These and additional objects and advantages of the present invention will be more readily understood after a consideration of the drawings and the detailed description of the preferred method.

DETAILED DESCRIPTION OF THE PREFERRED EMBODIMENT AND THE BEST MODE OF CARRYING OUT THE INVENTION

Figure 1:
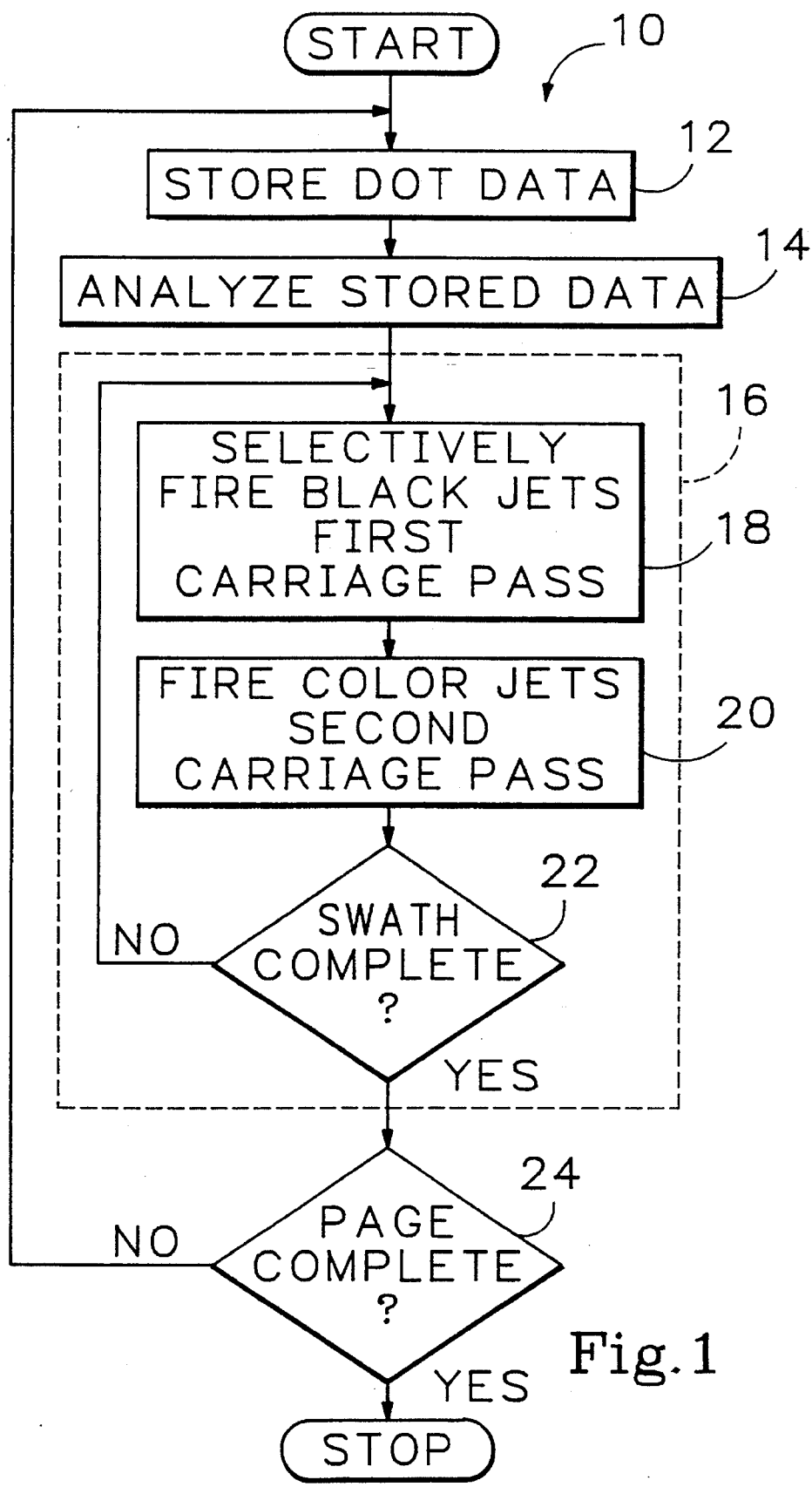
FIG. 1 schematically illustrates the preferred method of the invention in the form of a flowchart.

The flowchart of FIG. 1 is believed to be self-explanatory to those skilled in the art. Briefly, the invented method 10 may be seen from the flowchart of FIG. 1 to involve producing printed images on a liquid ink-jet printer having plural pens of different colors wherein ink dots of different colors are interposed along a print axis to produce desired color hues. It will be understood that, unless needed, the ordered and/or spatially or temporally controlled black and color dot printing described herein is avoided such that there is no adverse throughput impact when the possibility of black-to-color bleeding is determined not to exist. In such case, printing may proceed conventionally. Accordingly, method 10 may be described as including the steps of 1) storing ink dot data at 12 in a memory connected with the printer; 2) analyzing the stored ink dot data at 14 to determine whether any represent differently colored closely adjacent dots along such axis; and if so then 3) printing closely adjacent dots of different colors at 16 by firing the plural pens such that any difference between timing of the pen firings to print such adjacent dots is minimized.

The invented method may be thought of alternatively as involving the ordered interleaving of horizontal black and colored print passes to produce tinted color areas including plural instances of horizontally adjacent color and black dots. The preferred interleaving print steps include firing ink drops from one or more of the ink jets of the black ink pen during a first carriage pass at 18 and firing ink drops from one or more of the ink jets of the color ink pen during a second pass at 20. Such preferably ordered firings of first the black and then the color ink pens is performed in such manner that, as between any two horizontally adjacent black and color ink drops within such tinted color area, the time between the firings thereof is substantially constant, as by firing the black ink jets selectively, whether spatially or temporally (or both) relative to the firing of the color ink jets. It is believed that it is these two printing criteria-depositing black ink before depositing color ink, and timing the depositions consistently-that contribute most to the consistency with which high-quality interposed black and color ink dot printing is performed.

Typically, the pens of different colors within the ink-jet printer include a monochrome ink pen, e.g. one having black ink, and a tri-color ink pen, e.g. one having cyan, magenta and yellow ink. Thus, the preferred method better may be understood in this context to involve printing that is performed by firing the black pen prior to firing the tri-color pen to produce interposed black ink dots and one or more tri-color ink dots as in a pattern of color-tint printing. Typically, color swath printing requires more than one black and color ink jet-firing pass of the printer's carriage, as indicated at 22, and a page print portion of a print job typically involves printing more than one color swath, as indicated at 24.

The invented method also may be appreciated by those skilled in the arts as representing an improvement on a method usable with plural-pen ink-jet printing whereby color and black ink dots are printed horizontally adjacent one another and the printer's black pen has more ink jets than has the color pen, which is the context in which the problem arises. The improvement will be understood to include a first step of firing selected ones of substantially all vertically adjacent ink jets of the color pen during any one given pass of the printhead at 20, with the vertical span of selected color ink jets defining a color swath height. The improvement also may be seen to include a second step of firing selected ones of a selected group of vertically adjacent ink jets of the black pen during any other given pass of the printhead at 18, with the vertical span of black ink jets in said selected group defining a swath height that is approximately equal to such defined color swath height. As noted, preferably the firing of the selected ink jets of the black pen is performed before the firing of tile selected ink jets of the color pen.

Briefly summarizing, fewer than all ink jets in any column or as between columns may be fired, e.g. every other may be fired to reduce resolution or to produce gray-scaled or light-hued color output. Nevertheless it is the ratio between the effective swath heights of the black and color passes, not the ratio between ink jet firings or orifices, that is important to carrying out the invention.

Figure 2:
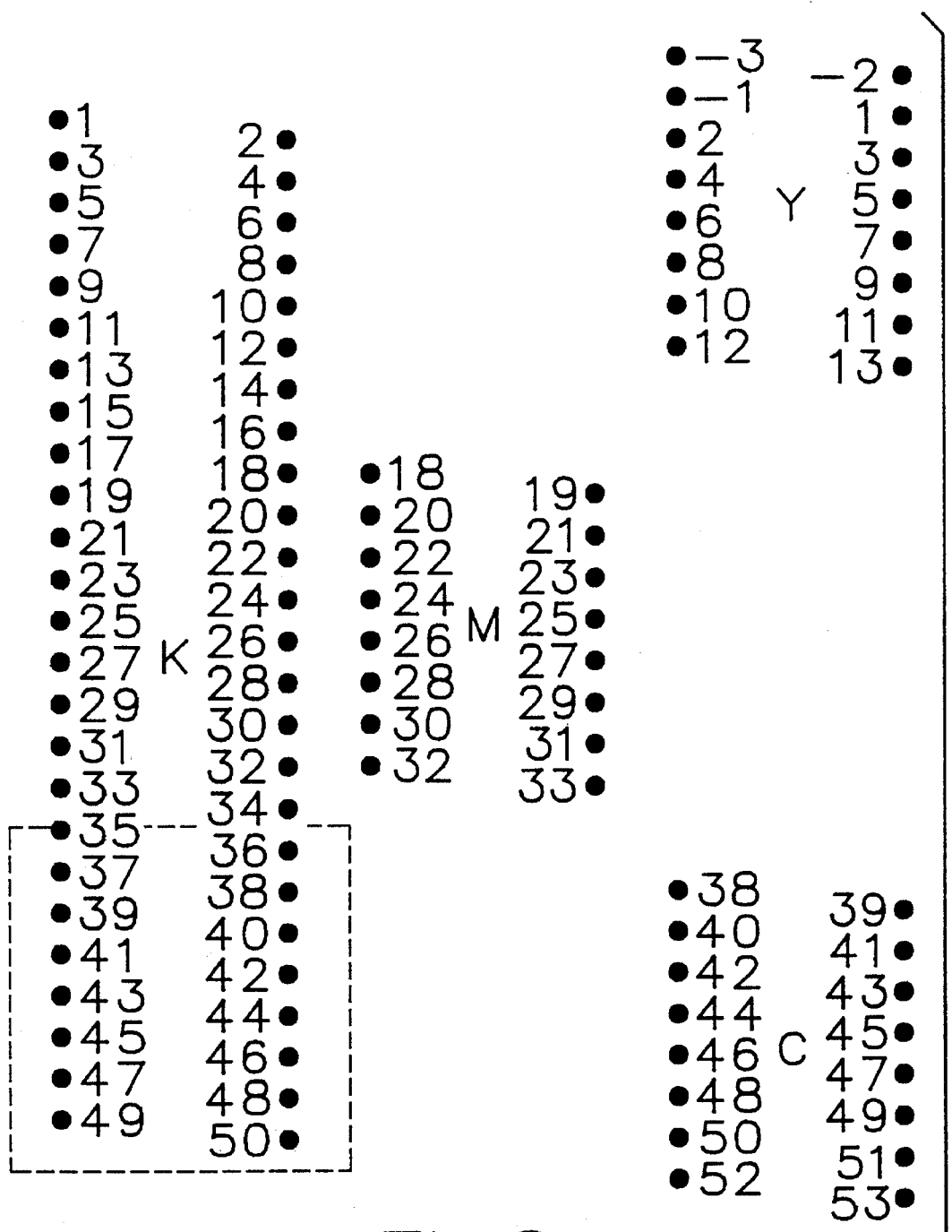
FIG. 2 schematically illustrates the vertical alignment aspects of the a typical black and color pen of a two-pen printhead.

This improved method of black and color liquid ink color printing may be better understood by reference to FIG. 2, which schematically illustrates a typical two-pen printhead configuration and the layouts of the black and color ink-jet orifices in their typical inter-pen registration. The tri-color pen on the right of FIG. 2 will be understood to represent a "paper's eye" view of the pen orifice or nozzle arrangement. The same is true for the black pen shown on the left of FIG. 2. The two pens' home orifices will be understood nominally to be separated center to center (laterally) by approximately 34 millimeters (34 mm), although such separation is not shown in FIG. 2.

The tri-color pen has three identical but differently positioned sets of columnar, or bi-line orifices, one for each of the cyan, magenta and yellow ink reservoirs contained therein. The black pen appears from FIG. 2 to have a singular oval set of orifices, but, in fact, it too has two columns of operative orifices, generally as described above regarding the tri-color pen (the oval-closing end orifices are non-printing). It is noted that the printhead carriage containing the pens passes typically from right to left in FIG. 2, or perpendicularly to the long axes of tile columnar, hi-line orifice sets.

FIG. 2 is believed to be helpful in illustrating the vertical offsets as between each of the color pens and the black pen that produce the dots that are described herein as being interposed or juxtaposed with one another in color tinting. It will be understood by those of skill in the arts that firmware executing in the ink-jet printer's controller controls the firing of each of the ink jets of each or the pens to produce printed pages. Such ink jet-firing firmware forms no part of tile present invention. On the other hand, the firmware that makes it possible to produce the high-quality color printing described herein preferably is implemented in accordance with the flowchart of FIG. 1, with an understanding that, during any given uni-directional printhead carriage pass, one or more different primitive colors of ink typically is deposited—be it from the cyan (C) pen, the magenta (M) pen and/or the yellow (Y) pen—while during any other uni-directional printhead carriage pass, only black ink typically is deposited-as from the black (K) pen—as the corresponding orifice sets are variously labeled in FIG. 2.

It will be seen from FIG. 2 that there are various offsets of the cyan (C), magenta (M) and yellow (Y) pens from the black pen. These are believed to be clearly illustrated by the use of common index numbers in labeling all of the orifices of the various pens. For example, those of the black (K) pen are numbered 1 through 50. Those of the yellow (Y) pen are numbered–3 through 13, with the numbers indicating the relative position of the orifices from correspondingly positioned ones of the black (K) pen having identical numbers and with the numbers −3, −2, −1 indicating positions relative to orifice 1 of the black (K) pen that are shifted upwardly therefrom. Those of the magenta (M) pen are numbered 18 through 33, which again correspond with identically numbered orifices of the black (K) pen. Finally, those of the cyan (C) pen are numbered 38 through 53, with those numbered 38 through 50 corresponding with those identically numbered orifices of the black (K) pen and with the orifices numbered 51, 52, 53 indicating positions relative to orifice 50 of the black (K) pen that are shifted downwardly therefrom.

The dashed outline in FIG. 2 that embraces the black (K) pen orifices numbered 35 through 50 indicates those orifices (or actually their corresponding ink jets not shown) that are used in accordance with the preferred method of the invention during black ink print passes of the ink-jet printer's carriage to print a black swath of preferably approximately, more preferably substantially, and most preferably exactly, equal height to the color swath that would be printed by each of the magenta (M), cyan (C) and yellow (Y) pens, which as may be seen from FIG. 2 typically to have vertical arrays of substantially less vertical height.

It is believed to be preferable that the defined black swath height does not vary from the defined color swath height, at least over period of time over which a page of color is printed, by greater than approximately 25%. For example, it has been discovered that greatly improved color printing quality is achieved when the group of vertically adjacent ink jets of the black pen that are fired during a black printhead pass is as high as twenty. While this represents a twenty-five percent greater black swath height than the color swath height defined by all vertically adjacent sixteen ink jets of each of the color pens, nevertheless there is produced no visible color banding, or at least greatly reduced color banding.

It will be appreciated that the black (K) pen might provide more or less vertical resolution than any of the color (CMY) pens. For example, the black pen might have twice the vertical resolution of any of the color (CMY) pens, i.e. the black (K) might have twice the number of vertically arrayed orifices (and corresponding ink jets) as that shown in FIG. 2. Nevertheless, in accordance with the preferred method of the invention as described and claimed herein, the same vertical array of orifices as is represented by the dashed outline (containing twice the number of black orifices) would be used to print a black swath during a single pass of the printhead carriage so that it such black swath height corresponded approximately to the vertical height of a swath defined by a color pen (although the color pen might contain only approximately half as many orifices). Again, it will be appreciated that it is the approximately equal height of the swaths printed during the preferably earlier black print pass of the carriage and the preferably later color print pass thereof that are believed to be important, as opposed to the number of orifices defining such swaths.

It has been determined that depositing black ink drops before depositing juxtaposed color ink drops is an important contributor to the reduction of visible color banding. Thus, the method of the invention by which color banding is reduced may be described alternatively as follows. It may be seen to involve a method of interleaving horizontal black and color printhead passes to produce tinted color areas including plural instances of horizontally adjacent black and color dots. (It will be appreciated that below a certain number of dots of height in a tinted color area, there presumably would be color banding, but such might not be visible because of its relatively small scale.)

The invented method may be thought of in the alternative as including performing a black printhead pass to deposit black ink dots, and thereafter performing a color printhead pass to deposit color ink dots that are closely horizontally adjacent such deposited black ink dots. This has been seen to reduce the tendency or the black ink to bleed into the color ink, which tendency is observed to be substantially greater than the tendency of the color ink to bleed into the black ink. Ideally, it is preferred that such earlier black ink deposition be performed sufficiently earlier that the black ink is substantially dry before the color ink is deposited. Nevertheless, and surprisingly, it has been discovered that there is bleeding of black ink into closely adjacent color ink, i.e. where the ink dots barely or nominally touch even tangentially, even after the color ink has substantially completely dried, whereas such is not the case if, as is described herein as being preferred, the black ink is deposited first.

In accordance with the preferred method, such printhead pass-performing steps are controlled, e.g. by the printer's controller, to achieve approximately constant timing between the deposit of such closely horizontally adjacent black and color ink dots, as this is believed also to affect the degree of visible color banding. As suggested above herein with reference to the fact that the height of the black swath can be as much as 25% greater than the height of the color swath without appreciable adverse effect, preferably such timing between such deposits also does not vary over a page of color printing by greater than approximately twenty-five percent. Nevertheless, it is believed that the invented color variation control method and apparatus may be somewhat more tolerant of juxtaposed black and color dot deposition timing—especially when, as is preferred, black ink dots are deposited before horizontally adjacent color dots are deposited—and that such timing may vary over a page of color printing by as much as 50% or more without undesirably noticeable color banding.

Industrial Applicability

It may be seen then that the invented method significantly reduces undesirable visible color banding, or color variations, that otherwise would compromise color print consistency and overall print quality in liquid ink-jet printing. Black-to-color ink bleeding is not eliminated, but its adverse effects are minimized by printing horizontally adjacent black and color ink drops wherever they appear on a page in that order and with consistent, and preferably constant, timing therebetween. Thus, a two-pen ink-jet printer having a black pen and a color pen may be used to lay down vertically extensive tinted color patterns without visible artifacts that otherwise would result from the reverse ordered color-then-black printing or the disparate number of ink jets available for firing in the two pens. The high-quality color tint palette range is thus extended with minimum printer throughput reduction.

While the present invention has been shown and described with reference to the foregoing operational principles and preferred method, it will be apparent to those skilled in the art that other changes in form and detail may be made therein without departing from the spirit and scope of the invention as defined in the appended claims.

I claim:

1. A method of producing printed images on a liquid ink-jet printer having plural pens of different colors wherein ink dots of different colors are interposed along a horizontal print axis to produce desired color hues, the method comprising the steps of:

storing ink dot data in a memory connected with the printer;

analyzing said stored ink dot data to identify whether any of the ink drop data represent differently colored closely adjacent dots along such axis; and upon identifying closely adjacent dots of different colors, printing such closely adjacent dots of different colors by firing selected ink jets of one pen during one pass of the pens and firing selected ink jets of another pen during another pass of the pens where ink jets are selected such that a vertical span of selected ink jets of the one pen is approximately equal to a vertical span of selected ink jets of the other pen, a difference between an elapsed time between the firings of a first pair of horizontal adjacent different color ink drops and an elapsed time between the firings of any other pair of horizontally adjacent different color ink drops thus being minimized.

2. The method of claim 1 in which the pens of different colors include a black ink pen and a tri-color pen, wherein said printing is performed by firing the black pen prior to firing the tri-color pen to produce interposed black ink dots and one or more tri-color ink dots.

3. For use in a plural-pen ink-jet printer having a black liquid ink pen and a color liquid ink pen, a method of interleaving horizontal black and color printhead passes to produce a multi-swath tinted color area including plural instances of horizontally adjacent black and color dots, the method comprising the steps of:

performing a black printhead pass to deposit black ink dots in a black ink dot swath having a black swath height, and thereafter performing a color printhead pass to deposit color ink dots in a color ink dot swath having a color swath height such that the deposited color ink dots are closely horizontally adjacent such deposited black ink dots, wherein each of said performing steps are controlled to standardize the black swath heights and color swath height such that an elapsed time between a deposit of any closely horizontally adjacent black and color ink dot pair is substantially the same as an elapsed time between a deposit of every other closely horizontally adjacent black and color ink dot pair within the multi-swath tinted color area, regardless of the multi-swath tinted color area's shape, thereby to reduce the tendency of the black ink to bleed inconsistently into the color ink.

4. The method of claim 3, wherein each of said performing steps are controlled to achieve timing between such deposits that does not vary over a full page area of color printing by greater than approximately twenty-five percent.

* * * * *

UNITED STATES PATENT AND TRADEMARK OFFICE
CERTIFICATE OF CORRECTION

PATENT NO. : 5,512,923
DATED : April 30, 1996
INVENTOR(S) : Joseph H. Bauman

It is certified that error appears in the above-identified patent and that said Letters Patent is hereby corrected as shown below:

Column 1, (line 61), delete "or" and insert therefor --of--.

Column 2, (line 29), after "AND" delete "THE".

Column 3, (line 35), delete "tile" and insert therefor --the--.

Column 3, (line 66), delete "tile" and insert therefor --the--.

Column 3, (line 66), delete "hi-line" and insert therefor --bi-line--.

Column 4, (line 7), delete "or" and insert therefor --of--.

Column 4, (line 8), delete "tile" and insert therefor --the--.

Column 5, (line 33), delete "or" and insert therefor --of--.

Column 6, (line 41), delete "horizontal" and insert therefor --horizontally--.

Column 6, (line 65), delete "heights" and insert therefor --height--.

Signed and Sealed this

Fifth Day of January, 1999

*Attest:*

*Attesting Officer*

*Acting Commissioner of Patents and Trademarks*